(12) United States Patent
Ogawa (10) Patent No.: US 9,083,877 B2
(45) Date of Patent: Jul. 14, 2015

(54) IMAGE PROCESSING APPARATUS, FOCUS DETECTION APPARATUS, AND NON-TRANSITORY COMPUTER-READABLE STORAGE MEDIUM

(71) Applicant: CANON KABUSHIKI KAISHA, Tokyo (JP)

(72) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/788,396

(22) Filed: Mar. 7, 2013

(65) Prior Publication Data

US 2013/0235276 A1    Sep. 12, 2013

(30) Foreign Application Priority Data

Mar. 12, 2012 (JP) ................. 2012-054569

(51) Int. Cl.
| | |
|---|---|
| H04N 5/232 | (2006.01) |
| H04N 5/359 | (2011.01) |
| H04N 5/14 | (2006.01) |
| H04N 5/369 | (2011.01) |
| H04N 9/04 | (2006.01) |

(52) U.S. Cl.
CPC ............ *H04N 5/23212* (2013.01); *H04N 5/14* (2013.01); *H04N 5/359* (2013.01); *H04N 5/3696* (2013.01); *H04N 9/045* (2013.01)

(58) Field of Classification Search
CPC . H04N 5/3696; H04N 5/23212; H04N 5/359; H04N 5/14
USPC ................................... 348/345–356
See application file for complete search history.

(56) References Cited

U.S. PATENT DOCUMENTS

| | | | |
|---|---|---|---|
| 2008/0180554 A1* | 7/2008 | Kobayashi et al. | 348/246 |
| 2013/0021499 A1* | 1/2013 | Ui et al. | 348/238 |

FOREIGN PATENT DOCUMENTS

| | | |
|---|---|---|
| JP | 2001-083407 | 3/2001 |
| JP | 2011221253 A * | 11/2011 |

* cited by examiner

*Primary Examiner* — Nelson D. Hernández Hernández
(74) *Attorney, Agent, or Firm* — Cowan, Liebowitz & Latman, P.C.

(57) ABSTRACT

An image processing apparatus processes an image signal from an image pickup element including a plurality of pixels for one microlens, and the image processing apparatus includes a saturation detector configured to detect whether an output value of each of the plurality of pixels reaches a saturation level, and a saturation corrector configured to correct an output value of a saturation pixel that reaches the saturation level and an output value of an adjacent pixel that shares the same microlens with the saturation pixel.

12 Claims, 8 Drawing Sheets

IMAGE PROCESSING APPARATUS, FOCUS DETECTION APPARATUS, AND NON-TRANSITORY COMPUTER-READABLE STORAGE MEDIUM

BACKGROUND OF THE INVENTION

1. Field of the Invention

The present invention relates to an image processing apparatus that processes an image signal from an image pickup element including a plurality of pixels for one microlens.

2. Description of the Related Art

Previously, a technology that obtains pupil division images by an image pickup element including a plurality of pixels for one microlens and that performs focus detection using a phase difference of the two obtained pupil division images has been known. For example, Japanese Patent Laid-Open No. 2001-83407 discloses an image pickup apparatus that calculates a phase difference based on pupil division images to perform the focus detection. In Japanese Patent Laid-Open No. 2001-83407, all output values of a plurality of pixels that correspond to the same microlens are added to be treated as one pixel, and thus a pixel array that is equivalent to a conventional one is configured.

However, in the configuration as disclosed in Japanese Patent Laid-Open No. 2001-83407, there is a possibility that each of the plurality of pixels corresponding to the same microlens reaches a saturation level. In other words, when a specific pixel reaches the saturation level, charges permitted in the conventional configuration where one pixel corresponds to one microlens may be leaked from the specific pixel to be lost.

SUMMARY OF THE INVENTION

The present invention provides an image processing apparatus, a focus detection apparatus, and a non-transitory computer-readable storage medium that are capable of obtaining a desired final output even when an output value of a pixel reaches a saturation level and also performing a saturation correction to perform highly-accurate focus detection.

An image processing apparatus as one aspect of the present invention processes an image signal from an image pickup element including a plurality of pixels for one microlens, and the image processing apparatus includes a saturation detector configured to detect whether an output value of each of the plurality of pixels reaches a saturation level, and a saturation corrector configured to correct an output value of a saturation pixel that reaches the saturation level and an output value of an adjacent pixel that shares the same microlens with the saturation pixel.

A focus detection apparatus as another aspect of the present invention includes the image processing apparatus, and a focus detector configured to perform focus detection using an output signal from the image processing apparatus.

A non-transitory computer-readable storage medium as another aspect of the present invention stores a program that causes an information processing apparatus to execute an image processing method, and the image processing method comprising the steps of reading an output value of each of a plurality of pixels obtained from an image pickup element including a plurality of pixels for one microlens and information of a saturation pixel indicating that the output value of each of the plurality of pixels reaches a saturation level from a storage unit, and correcting an output value of the saturation pixel that reaches the saturation level and an output value of an adjacent pixel that shares the same microlens with the saturation pixel based on the information read from the storage unit.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 2:
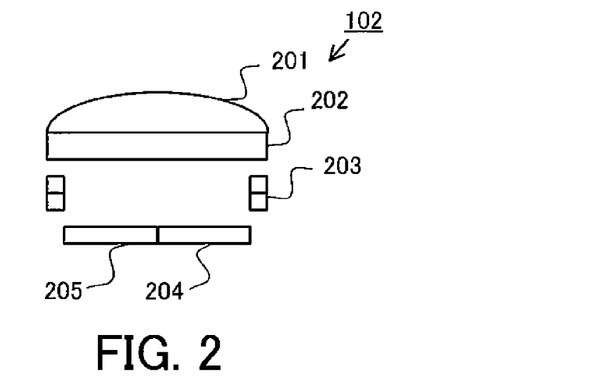
FIG. 2 is a diagram of illustrating a pixel structure of an image pickup element in each of embodiments.

First of all, referring to FIG. 2, a structure of an image pickup element 102 in the present embodiment will be described. Reference numeral 201 denotes a microlens that collects light on pixels. Reference numeral 202 denotes a color filter, which has a color such as R, G, or B and is repeatedly arrayed with a constant period. Reference numeral 203 denotes a wiring layer of a semiconductor. Reference numerals 204 and 205 denote pixels (photoelectric conversion portions) that perform photoelectric conversions, each of which is configured by including a photodiode. In a common image pickup element, one photoelectric conversion portion is configured by one photodiode, but the image pickup element 102 of the present embodiment can obtain pupil division images (pupil separation images) by the two divided pixels 204 and 205. Since the pupil is divided between an image formed by collecting the pixels 204 and an image formed by collecting the pixels 205, a parallax is generated. Using the parallax, focus detection or obtaining a stereo image can be performed. Since the same pupil shape as that of a common pixel is obtained when pixel values of the pixels 204 and 205 are added, similar image as that of a conventional image pickup element can be obtained by performing a normal signal processing for the added pixel.

Figure 3A:
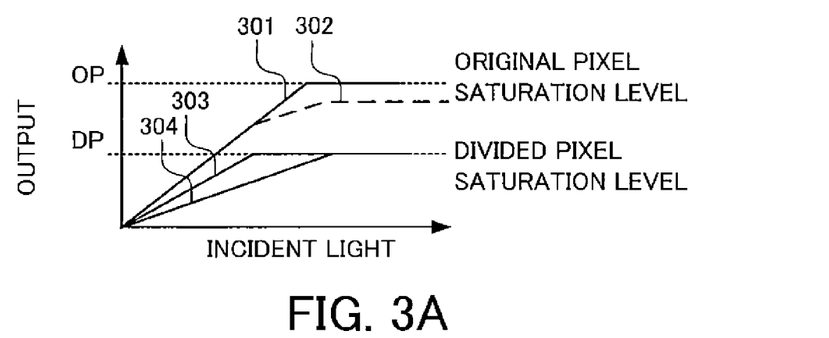
FIGS. 3A and 3B are diagrams of illustrating a relation between incident light on a photodiode of the image pickup element and an output of a pixel in each of the embodiments.
Figure 3B:
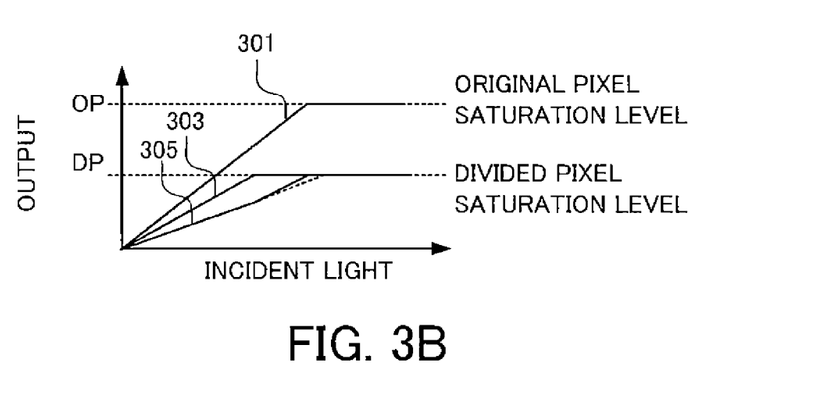

Next, referring to FIGS. 3A and 3B, a saturation of an output value of the pixel will be described. FIGS. 3A and 3B are diagrams of illustrating a relation between incident light on the pixel of the image pickup element 102 and the output value of the pixel. A lateral axis indicates an intensity of the incident light on the microlens 201, and a vertical axis indicates a pixel value (an output value) outputted from the pixel. Reference numeral 301 denotes output characteristics of a case in which the pixel (the photodiode) is not divided, which keeps linearity up to a saturation level OP. If the incident light on the microlens 201 is uniformly illuminated on the divided pixels, the same characteristics as the output characteristics 301 are obtained by adding the divided pixels. However, if the pixel is not positioned at a center of an image height and an in-focus state is not obtained, the incident lights on the divided pixels are not uniform.

Figure 4:
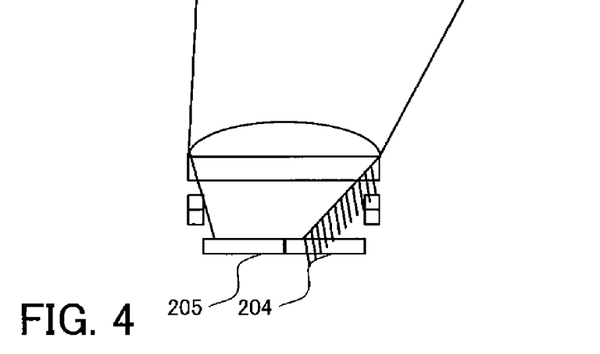
FIG. 4 is a diagram of describing a non-uniform incident light on the photodiode of the image pickup element in each of the embodiments.

Subsequently, referring to FIG. 4, a case where the incident lights on the divided pixels are not uniform will be described. FIG. 4 is a diagram of describing non-uniform incident light, which illustrates a situation where the light is illuminated on a pixel in a region of a higher image height, i.e. a surrounding pixel of a screen. Since the light obliquely enters the surrounding pixel of the screen, the light is not illuminated on most of the pixel 204, and most of the light illuminates the pixel 205. Therefore, in the state as illustrated in FIG. 4, an output of the pixel 205 is saturated earlier.

In FIG. 3A, reference numeral 303 denotes output characteristics of the pixel 205, reference numeral 304 denotes output characteristics of the pixel 204. In the situation of FIG. 4, as can be seen by comparing the output characteristics 303 and 304, the output value of the pixel 205 reaches the saturation level earlier than the output value of the pixel 204. Therefore, the characteristics of the pixel (the added pixel) that is obtained by adding the output values of the pixels 204 and 205 are indicated as output characteristics 302 that are influenced by the saturation of the pixel output earlier. In order to reduce the influence by the saturation of the pixel output, it is preferred that characteristics as illustrated in FIG. 3B be obtained. As a structure where a semiconductor impurity concentration at a boundary between the pixels 204 and 205 is lower than a semiconductor impurity concentration at a boundary between other pixels, a pixel structure having a low potential barrier between the pixels 204 and 205 is adopted. When the output value of the pixel reaches the saturation level, the structure is configured so that a charge generated in the pixel 205 leaks into the pixel 204, and therefore the output characteristics 301 can be obtained by adding the output values of the pixels 204 and 205. In this case, the output characteristics of the pixel 204 are changed to output characteristics 305 in FIG. 3B.

Figure 5A:
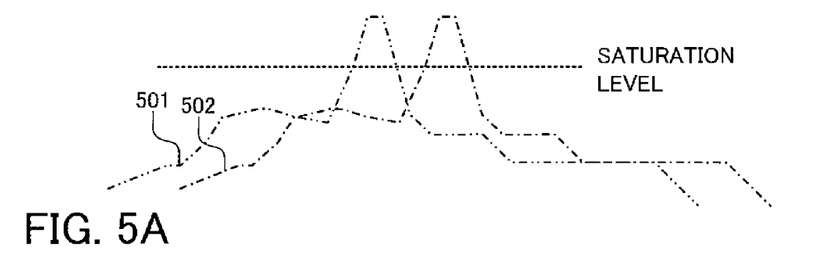
FIGS. 5A to 5C are waveform diagrams of image signals that are obtained using divided pixels in an out-of-focus state.
Figure 5B:
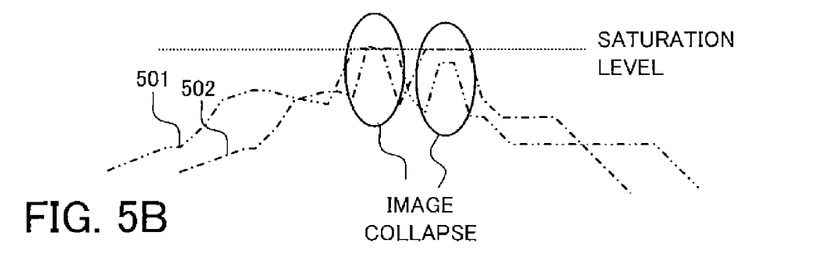
Figure 5C:
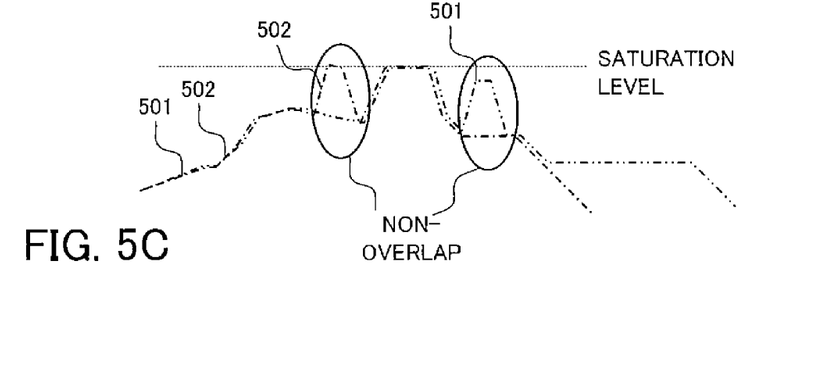

Next, referring to FIGS. 5A to 5C, an image collapse caused by the saturation of a pixel output in a pixel structure as a reference example will be described. FIGS. 5A to 5C are waveform diagram of image signals that are generated by using divided pixels in an out-of-focus state. In FIGS. 5A to 5C, reference numeral 501 denotes an image obtained from the pixel 205, and reference numeral 502 denotes an image obtained from the pixel 204. FIG. 5A illustrates an ideal image obtained when the pixel output is not saturated. FIG. 5B illustrates a situation where the pixel output is saturated and a facing image is also deformed by the leaked charge. FIG. 5C illustrates a part of an error generation factor in a calculation in which an image is shifted by a correlation calculation used to perform focus detection or generate a range image so as to obtain a shift amount where degree of coincidence is high. Thus, the charge leaked by the pixel saturation deforms the image, and lowers the degree of coincidence to obtain the shift amount. In addition, when showing a stereo image, the generation of a crosstalk is viewed at the part in the drawing.

Embodiment 1

Figure 1:
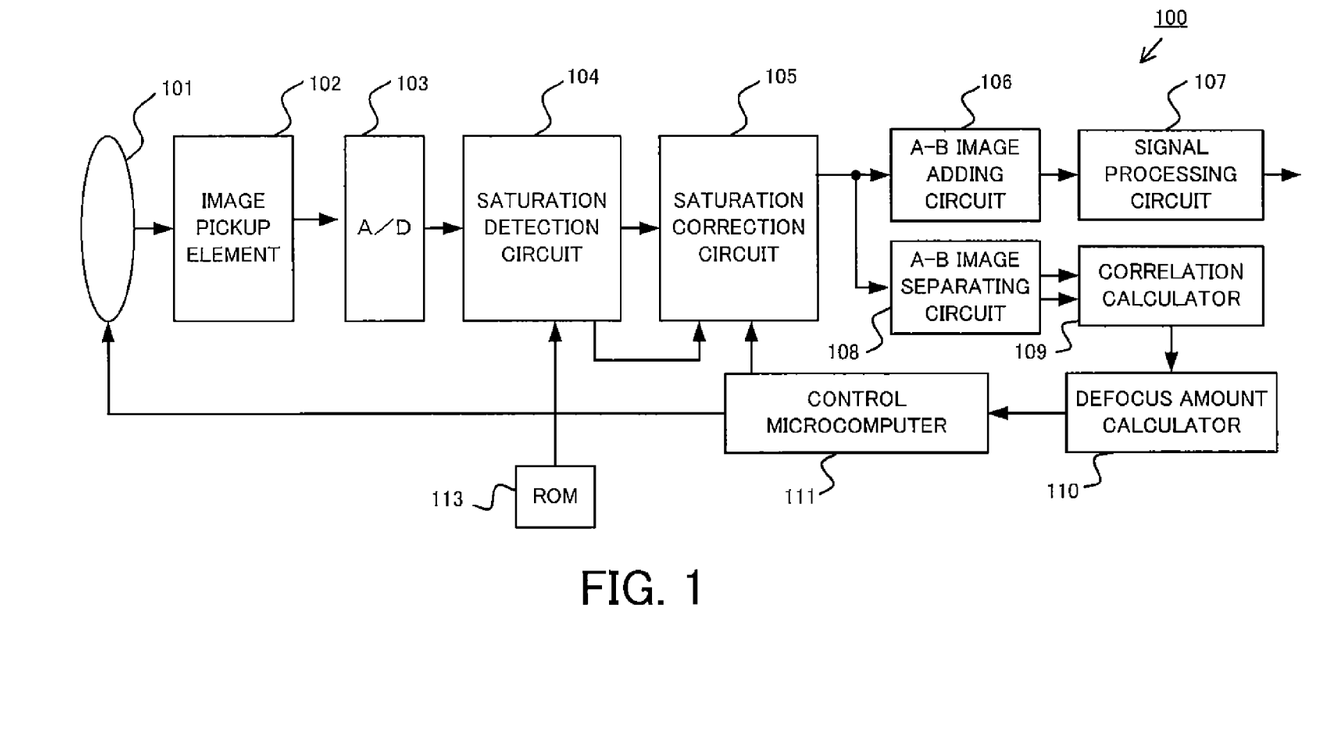
FIG. 1 is a block diagram of an image pickup apparatus in Embodiment 1.

Next, referring to FIG. 1, an image pickup apparatus in Embodiment 1 of the present invention will be described. FIG. 1 is a block diagram of an image pickup apparatus 100 in the present embodiment. The image pickup apparatus 100 includes an image processing apparatus that processes an image signal from an image pickup element having a plurality of pixels for one microlens. The image pickup apparatus 100 obtains the image signal (pupil division images) from this image pickup element, and performs focus detection based on a phase difference of the two obtained pupil division images so as to effectively correct an image collapse caused by the saturation.

Reference numeral 101 denotes a lens unit (an optical system), reference numeral 102 denotes an image pickup element, reference numeral 103 denotes an A/D converter, reference numeral 104 denotes a saturation detection circuit (a saturation detector), and reference numeral 105 denotes a saturation correction circuit (a saturation corrector). The saturation detection circuit 104 detects whether an output value of each of the plurality of pixels reaches a saturation level, and outputs a signal that indicates the output value reaches the saturation level to the saturation correction circuit 105 at the next stage. The saturation correction circuit 105, as described below, corrects an output value of the saturation pixel that reaches the saturation level and an output value of adjacent pixel that shares the same microlens with the saturation pixel. The image processing apparatus of the present embodiment is configured by including the saturation detection circuit 104 and the saturation correction circuit 105.

Reference numeral 106 denotes an A-B image adding circuit, which adds each output value of the divided pixels that share one microlens 201 so as to output an added value as one pixel. Reference numeral 107 denotes a signal processing circuit, which converts an output signal of the A-B image adding circuit 106 into a color image signal. Reference numeral 108 denotes an A-B image separating circuit, which outputs two different image signals. The same signal as the signal inputted to the A-B image adding circuit 106 is inputted to the A-B image separating circuit 108. Reference numeral 109 denotes a correlation calculator, which performs a correlation calculation of the two image signals outputted from the A-B image separating circuit 108. Reference numeral 110 denotes a defocus amount calculator. Reference numeral 111 denotes a control microcomputer, which controls whole of a system of the lens unit 101 and the image pickup apparatus 100. A focus detector that performs the focus detection using the output signal from the image processing apparatus is configured by including the correlation calculator 109, the defocus amount calculator 110, and the control microcomputer 111. A focus detection apparatus is configured by the image processing apparatus and the focus detector.

Reference numeral 113 denotes a ROM (a memory) that stores an individual difference of the saturation level of the image pickup element 102. Previously, as a circuit of detecting the saturation level of the image pickup element, there has been a circuit that erases a non-linear part of a color or a false color that is generated at the time of the saturation. In this case, however, in order to gently change the chroma around the saturation level to obtain a pure white at the saturation level, an exact adjustment of the saturation level is not needed. On the other hand, in the present embodiment, in order to correct the charge leakage by the saturation with high accuracy, the individual difference of the saturation level is previously stored in the ROM 113 of the image pickup apparatus 100.

Figure 6:
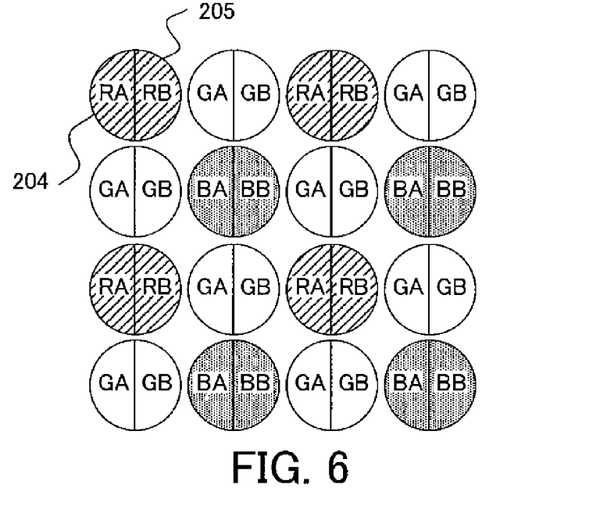
FIG. 6 is a diagram of illustrating a pixel array of the image pickup element in Embodiment 1.

Next, referring to FIG. 6, a pixel array of the image pickup element 102 in the present embodiment will be described. FIG. 6 is a diagram of illustrating the pixel array of the image pickup element 102. The pixels 204 and 205 in FIG. 6 correspond to the pixels 204 and 205 in FIG. 2 respectively, and the image pickup element 102 has a pixel configuration that is divided into two pixels to right and left with respect to the microlens 201. The images in which the pupil is divided into two are referred to as an A image and a B image to be distinguished. In FIG. 6, symbol RA denotes an A image pixel of a red color, and symbol RB denotes a B image pixel of the red color. Similarly, symbols GA and GB denote an A image pixel of a green color and a B image pixel of the green color respectively, and symbols BA and BB denote an A image pixel of a blue color and a B image pixel of the blue color respectively. In the embodiment, when the A image pixel and the B image pixel are added, a common array in a single-plate color image pickup element, which is called Bayer array, is obtained.

Next, a saturation correction method that is performed by the saturation correction circuit 105 will be described.

<First Correction Method>

Figure 7:
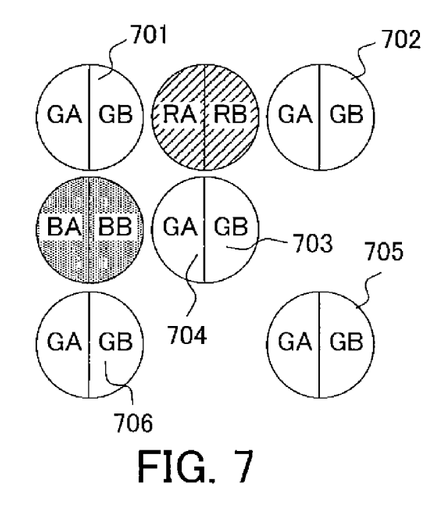
FIG. 7 is a diagram of illustrating the pixel array of the image pickup element in Embodiment 1.

First of all, referring to FIG. 7, a correction method (a first correction method) in a case where the same color pixel around the saturation pixel is not saturated will be described. The first correction method is a correction method using the same color pixel around (near) the saturation pixel. FIG. 7 is a diagram of illustrating the pixel array of the image pickup element 102. In FIG. 7, reference numeral 704 denotes an A image pixel of a green color, and reference numeral 703 denotes a B image pixel of the green color. In the present embodiment, the A image pixel 704 is a saturation pixel whose output value reaches the saturation level. The B image pixel 703 is an adjacent pixel that shares the same microlens with the A image pixel 704 (the saturation pixel), and its output value does not reach the saturation level. In the present embodiment, the A image pixel 704 and the B image pixel 703 are pixels for which the saturation correction is to be performed.

The output value of the B image pixel 703 (the adjacent pixel) is an added value of an intrinsic output value of the B image pixel 703 and a value obtained by charges leaked from the A image pixel 704 (the saturation pixel). Therefore, in the first correction method, the intrinsic value of the B image pixel 703 is estimated. The output value of the same color pixel arranged around (near) the B image pixel 703, i.e. the output value of the green color pixel does not reach the saturation level. Therefore, the output value of the same pixel arranged around the B image pixel 703 is reliable. Accordingly, referring to B image pixels 701, 702, 706, and 705 that have the same color (green color), the value of the B image pixel 703 is estimated using a defective pixel complementary algorithm (a correction algorithm). In the present embodiment, an average of the values of the B image pixels 701, 702, 706, and 705 is used. The average of the values of the B image pixels 701, 702, 706, and 705 is determined as a corrected value of the B image pixel 703, and a value that is obtained by adding a difference between the value of the B image pixel 703 and the corrected value of the B image pixel 703 to the A image pixel 704 is determined as a corrected value of the A image pixel 704.

Thus, the saturation correction circuit 105 corrects the output value of the saturation pixel and the output value of the adjacent pixel so that the added value of the output value of the A image pixel 704 (the saturation pixel) and the output value of the B image pixel 703 (the adjacent pixel) is maintained. Specifically, when an output value of the same color pixel that corresponds to a microlens different from a microlens shared with the saturation pixel and the adjacent pixel does not reach the saturation level, the saturation correction circuit 105 corrects the output value of the saturation pixel and the output value of the adjacent pixel using the output value of the same color pixel. In the present embodiment, the average of the values of the same color pixels around (near) the B image pixel 703 is used in order to estimate the output value of the B image pixel 703, but other correction methods may also be adopted if an algorithm that is proposed as the defective pixel complementary algorithm (the correction algorithm) is used.

<Second Correction Method>

Figure 8:
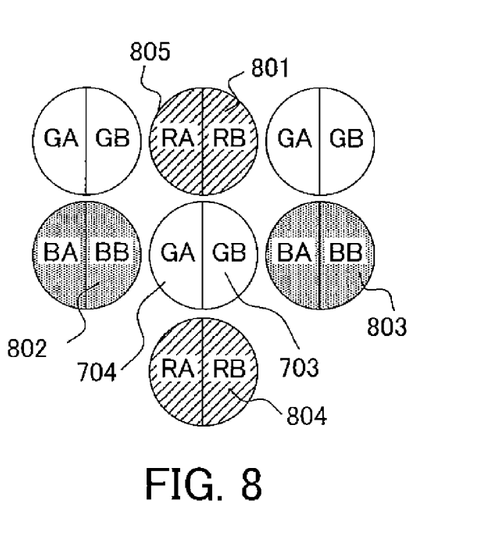
FIG. 8 is a diagram of illustrating the pixel array of the image pickup element in Embodiment 1.

Next, referring to FIG. 8, a correction method (a second correction method) in a case where the same color pixel around the saturation pixel is also saturated will be described. The second correction method is a correction method using a color ratio of the same color pixel and a different color pixel. FIG. 8 is a diagram of illustrating the pixel array of the image pickup element 102. In FIG. 8, the A image pixel 704 (the saturation pixel) is saturated and the charge leaks to the B image pixel 703 (the adjacent pixel). Similarly, with respect to the green color pixels around the saturation pixel, one of the A image pixel or the B image pixel is saturated. However, the pixel is not saturated in a state where the A image pixel and the B image pixel are added. In this state, in order to estimate the value of the B image pixel 703, another color pixel (the different color pixel) at the side of the B image that have the same pupil shape as that of the B image pixel 703 is used.

A B pixel 801 is at the B image side that is the same as the B image pixel 703, but it is a red color pixel (the different color pixel) that has a different color. Therefore, a value of the B image pixel 801 by itself cannot be used to estimate the B image pixel 703. Accordingly, a value of a green color pixel (the same color pixel) at a position of the B image pixel 801 is derived. In order to derive an output value of the green color pixel at the position of the B image pixel 801, a surrounding color is used. Based on the surrounding color that is obtained after adding the output values of the A image pixel and the B image pixel, the ratio of the red and the green is calculated, and an inverse of the calculated ratio is multiplied by the B image pixel 801 to derive the value of the green color pixel at the position of the B image pixel 801. Similarly, with respect to B image pixels 802, 803, and 804, values converted into the green pixel are obtained. Then, using the defective pixel correction algorithm (the correction algorithm), the value of the B image pixel 703 is estimated so as to perform the correction.

Thus, the second correction method is applied to the case where the output value of the same color pixel that corresponds to the microlens different from the microlens shared with the saturation pixel and the adjacent pixel reaches the saturation level. In this case, the saturation correction circuit 105 corrects the output value of the saturation pixel and the output value of the adjacent pixel using the output value of the different color pixel and the color ratio of the same color pixel and the different color pixel.

<Third Correction Method>

Next, a third correction method in the present embodiment will be described. The third correction method is a correction method using a ratio of output values of a plurality of same color pixels (a ratio of an A image and a B image) in an in-focus state. In the present embodiment, a defocus state can be determined based on a defocus amount calculation result of the defocus amount calculator 110. In the in-focus state, there is no parallax between the A image and the B image, and it completely coincides with an added image of the A image and the B image. However, when the pixel is not at an image height center, as described with reference to FIG. 4, the A image pixel and the B image pixel are not balanced and a pixel at one side may be saturated.

Figure 9:
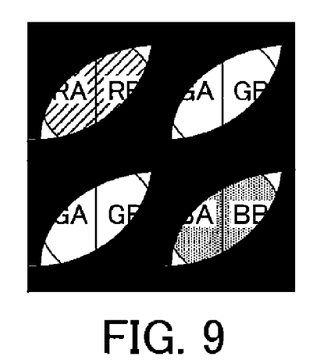
FIG. 9 is a diagram of illustrating a situation where a vignetting on the periphery of a screen is generated in each pixel in Embodiment 1.

FIG. 4 illustrates a phenomenon caused by an incident angle, but the phenomenon may also be caused by a vignetting. The vignetting is a phenomenon in which a light beam is limited at an edge at an object side or at a body side (an image side) when an aperture is set near an open state (a full-open state), which is also called as a mechanical vignetting. At a center of an optical axis (on the optical axis), there is no influence since the edge of the lens is larger than the aperture, but on the other hand, the influence may be generated when the image height is higher. FIG. 9 illustrates a situation where the vignetting around the screen is generated at each pixel. Both the incident angle for the pixel and the vignetting gently change as the image height from the optical axis center gets higher. Therefore, nearby pixels indicate substantially the same characteristics. Since a ratio of light intensities of the A image and the B image in a region in the in-focus state significantly depend on the vignetting and the incident angle, the ratios of the A images and the B images of the nearby pixels are substantially the same. Using the characteristics, in the region in the in-focus state, the correction may be performed so as to have the same ratio of the A image and the B image as that of the nearby pixel. Referring to FIG. 8, this correction method will be described. In FIG. 8, the A image pixel 704 is saturated, and a charge of the A image pixel 704 leaks to the B image pixel 703. The values of the A image pixel 704 and the B image pixel 703 are corrected so as to have the same ratio (the ratio of the A image and the B image) as that of an A image pixel 805 and a B image pixel 801.

Thus, in the third correction method, in the in-focus state, the saturation correction circuit 105 corrects the output value of the saturation pixel and the output value of the adjacent pixel using the ratio of the output values of the plurality of same color pixels that correspond to the microlens different from the microlens shared with the saturation pixel and the adjacent pixel.

<Fourth Correction Method>

Next, referring to FIGS. 5A to 5C, a fourth correction method that is used in an out-of-focus state will be described. The fourth correction method is a correction method using an alignment (a position adjustment). FIG. 5A illustrates an image that is to be intrinsically obtained, and FIG. 5B illustrates a state in which the image is collapsed by the saturation. In the out-of-focus state, since there is a parallax between an A image and a B image, an imaging position of the same image is shifted laterally. As a result, a saturation position of the A image and a saturation position of the B image are also shifted. Since the same image is shifted by the parallax, there is surely a position at which the images are overlapped if intentionally shifted. FIG. 5C is a state in which the images are shifted to be overlapped with each other. A defocus amount can be obtained by a direction of this image shift and a shift amount, but the descriptions are omitted since it is not the essence of the present invention.

Parts surrounded by circles in FIG. 5B reach the saturation level, which is a region that is to be corrected. In FIG. 5C, the same positions are indicated by being surrounded by circles. Parts that are surrounded by the circles and that are not overlapped with each other seem to be caused by a charge leaked by the saturation. Therefore, the correction can be performed by moving an amount corresponding to this difference to the saturation pixel side as it is.

Thus, the saturation correction circuit 105, in the out-of-focus state, corrects the output value of the saturation pixel and the output value of the adjacent pixel so that the degree of coincidence of pupil division images are heightened based on a correlation amount that is obtained by shifting phases of the pupil division images that are the output value of the saturation pixel and the output value of the adjacent pixel.

Figure 10:
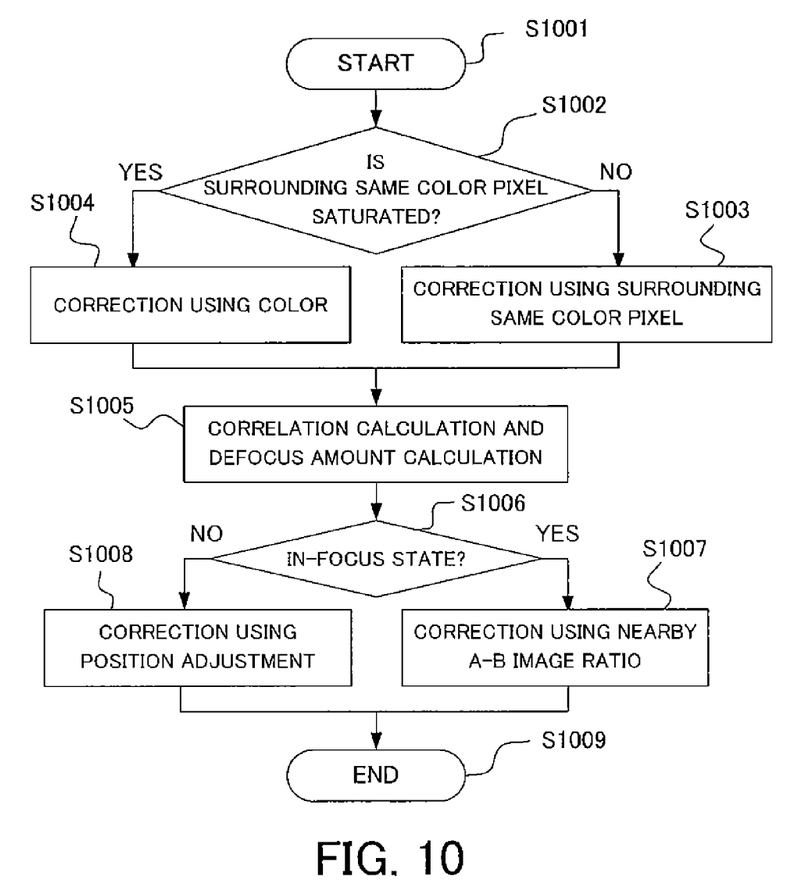
FIG. 10 is a flowchart of a saturation correction method in Embodiment 1.

Next, referring to FIG. 10, a saturation correction method using each of the above correction methods in the present embodiment (the first to fourth correction methods) will be described. FIG. 10 is a flowchart of the saturation correction method in the present embodiment. Each step in FIG. 10 is mainly performed by the saturation correction circuit 105 based on an instruction or information from the control microcomputer 111.

First of all, in Step S1001, a processing of the saturation correction method is started. In a first frame, there is no information related to the in-focus state. Therefore, in Step S1002, whether or not the surrounding same color pixel is saturated is determined. In Step S1002, when the surrounding same color pixel is not saturated, the flow proceeds to Step S1003. Then, in Step S1003, the saturation correction is performed by using the correction method (the first correction method) using the surrounding same color pixel. The details of the first correction method are as described above. On the other hand, in Step S1002, when the surrounding same color pixel is saturated, the flow proceeds to Step S1004. Then, in Step S1004, the saturation correction is performed by using the correction method (the second correction method) using the surrounding color. The details of the second correction method are as described above.

When the saturation correction is performed by one of the first correction method or the second correction method, correction data are sent to a circuit at the next stage. Subsequently, in Step S1005, a correlation calculation and a calculation of a defocus amount in each region are performed. The processing in Step S1005 is mainly performed by combining the control microcomputer 111 and the defocus amount calculator 110. Thus, in a subsequent frame, the correction can be performed by referring the defocus amount in a saturation correction region.

Subsequently, in Step S1006, whether or not the saturation region is in the in-focus state is determined. When the saturation region is in the in-focus state, the flow proceeds to Step S1007. Then, in Step S1007, the saturation correction is performed by using the correction method (the third correction method) using the ratio of the near A image and B image. The details of the third correction method are as described above. On the other hand, in Step S1006, the saturation region is in the out-of-focus state, the flow proceeds to Step S1008. Then in Step S1008, the correction is performed by adjusting positions of the images so as to shift the images to coincide with each other (the fourth correction method). The details of the fourth correction method are as described above. Through one of Step S1007 or S1008, the flow is ended (Step S1009).

Thus, the saturation correction circuit 105 (the control microcomputer 111) changes the correction method of the output value of the saturation pixel and the output value of the adjacent pixel in accordance with conditions such as whether the output value of the surrounding same color pixel reaches the saturation level or whether it is in the in-focus state. In the present embodiment, the saturation correction is performed by switching the four different types of correction methods (correction algorithms) in accordance with conditions. However, the present embodiment is not limited to this. For example, the saturation correction circuit 105 (the control microcomputer 111) may also correct the output value of the saturation pixel and the output value of the adjacent pixel using the plurality of correction methods so as to adopt the most reliable correction method based on a correlation calculation result of the corrected output values of the saturation pixel and the adjacent pixel.

Embodiment 2

Figure 11:
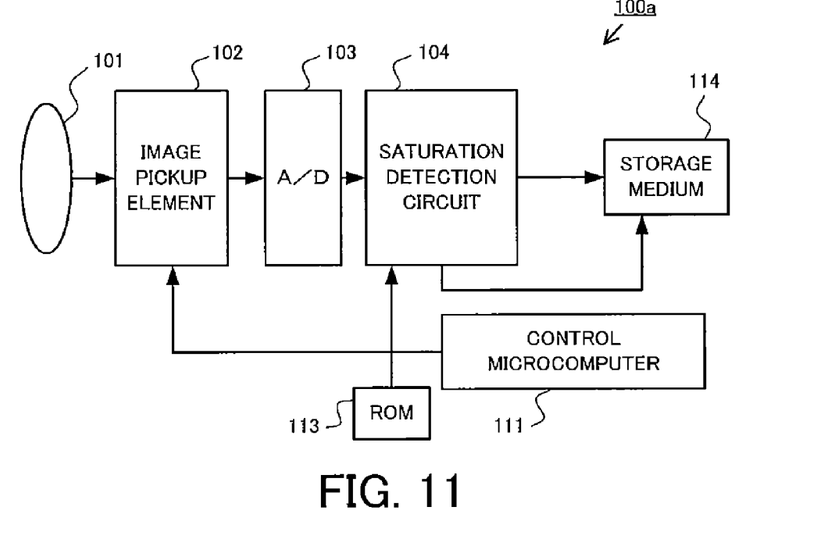
FIG. 11 is a block diagram of an image pickup apparatus in Embodiment 2.

Next, referring to FIG. 11, an image pickup apparatus in Embodiment 2 of the present invention will be described. FIG. 11 is a block diagram of an image pickup apparatus 100a in the present embodiment. The image pickup apparatus 100a is different from the image pickup apparatus 100 of Embodiment 1 in that the saturation detection result by the saturation detection circuit 104 and an unprocessed RAW signal are stored in a storage medium 114 (a storage unit), and other basic configurations are the same as those in Embodiment 1.

In the present embodiment, various kinds of signal processings such as the saturation correction are performed by an information processing apparatus such as a personal computer as a post-processing. In Embodiment 1, the parallax generated by the pupil division is used to perform the autofocus, but on the other hand, in the present embodiment, the parallax is used to generate a stereo image and a range image. In Embodiment 1, an algorithm that is switched in accordance with the in-focus state in a first frame is not adopted, but in the present embodiment, there is no such limitation since a processing is possible while stored data of the same frame are accessed many times at random. In Embodiment 1, the four correction methods (correction algorithms) are switched to be applied in accordance with conditions, but instead, all the correction methods may also be performed to determine an average of values as the correction value. Alternatively, all the correction methods may be performed to selectively adopt one correction method that has the highest degree of coincidence (the most reliable correction method) based on the correlation calculation result.

The present embodiment can also be provided as an image processing program that causes the information processing apparatus to execute the correction method (the image processing method) described above. In addition, the present embodiment can be provided as a non-transitory computer-readable storage medium storing the program that causes the information processing apparatus to execute the correction method. The information processing apparatus reads the output value of each of the plurality of pixels obtained from the image pickup element including the plurality of pixels for one microlens and information of the saturation pixel indicating that the output value of each of the plurality of pixels reaches the saturation level from the storage medium 114. Then, it corrects the output value of the saturation pixel that reaches the saturation level and the output value of the adjacent pixel that shares the same microlens with the saturation pixel based on the information read from the storage medium 114. Instead of the storage medium 114, a storage unit (a storage medium) provided in the information processing apparatus may also be used.

Embodiment 3

Next, referring to FIG. 12, an image pickup apparatus in Embodiment 3 of the present invention will be described.

Figure 12:
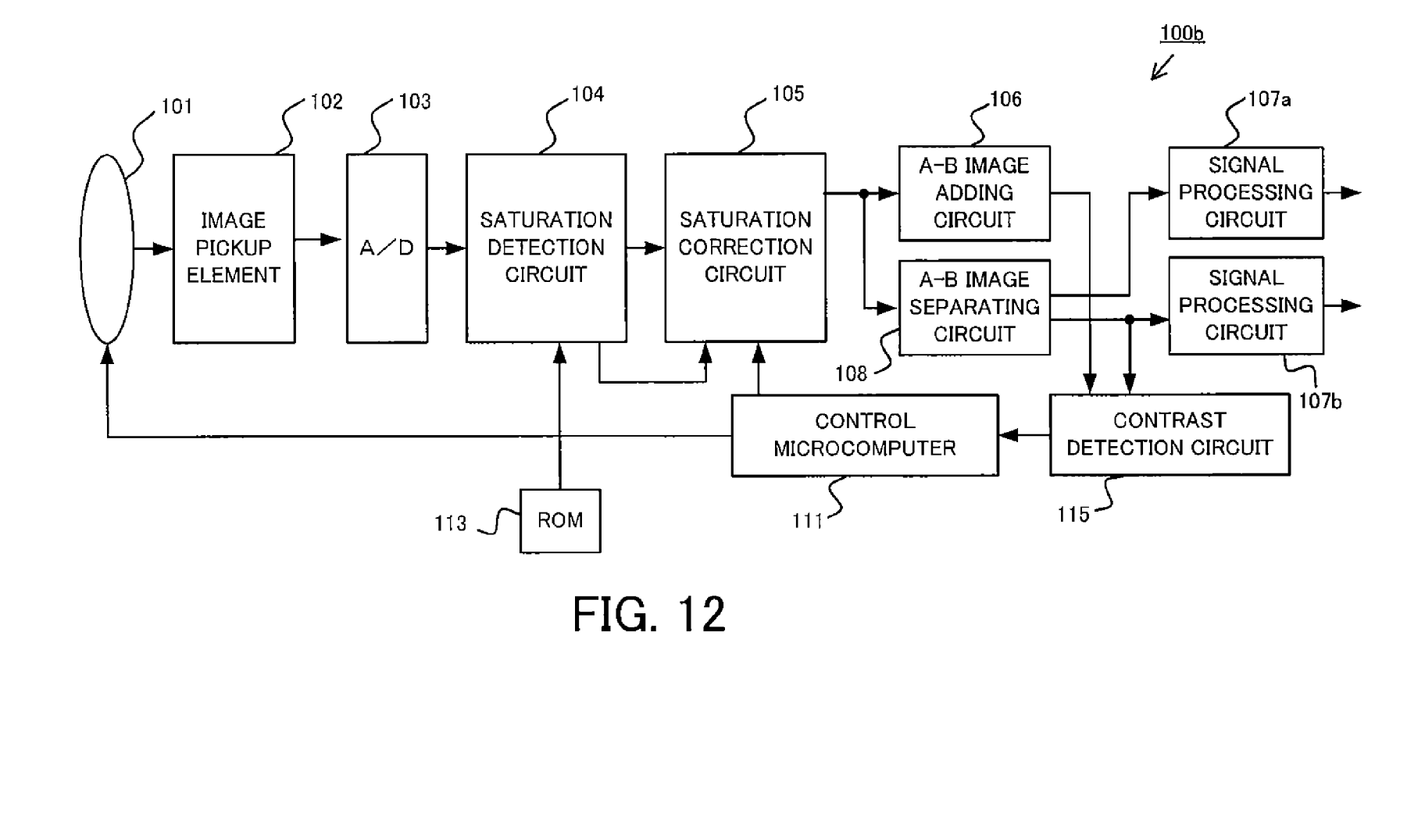
FIG. 12 is a block diagram of an image pickup apparatus in Embodiment 3.

FIG. 12 is a block diagram of an image pickup apparatus 100b in the present embodiment. The image pickup apparatus 100b is different from the image pickup apparatus 100 of Embodiment 1 in that the parallax images obtained by dividing the A image and B image are stored as a stereo image and that focus detection is performed by contrast detection, and other basic configurations are the same as those in Embodiment 1.

Specifically, output signals of the A image and the B image from the A-B image separating circuit 108 are inputted to signal processing circuits 107a and 107b, respectively. The signal processings are performed for these output signals by the signal processing circuits 107a and 107b, and the processed signals are outputted to a next stage. The image pickup apparatus 100b includes a contrast detection circuit 115. The output of the A-B image adding circuit 106 and the output of the A-B image separating circuit 108 are inputted to the contrast detection circuit 115. The output of the contrast detection circuit 115 is inputted to the control microcomputer 111. The control microcomputer 111 reads an output of the contrast detection circuit 115 to be used for the focus detection. The focus detection by the contrast detection method is performed by determining a relation between a position of a focusing lens and the contrast while a level of the contrast is read and the lens unit 101 is driven. However, this configuration is not the essence of the present invention, and therefore the descriptions of the configuration are omitted.

The output of the A-B image adding circuit 106 and the output of the A-B image separating circuit 108 are inputted to the contrast detection circuit 115. Any of the contrasts of the output signals are inputted to the control microcomputer 111, and the control microcomputer 111 selectively uses the results in accordance with a condition.

Figure 13:
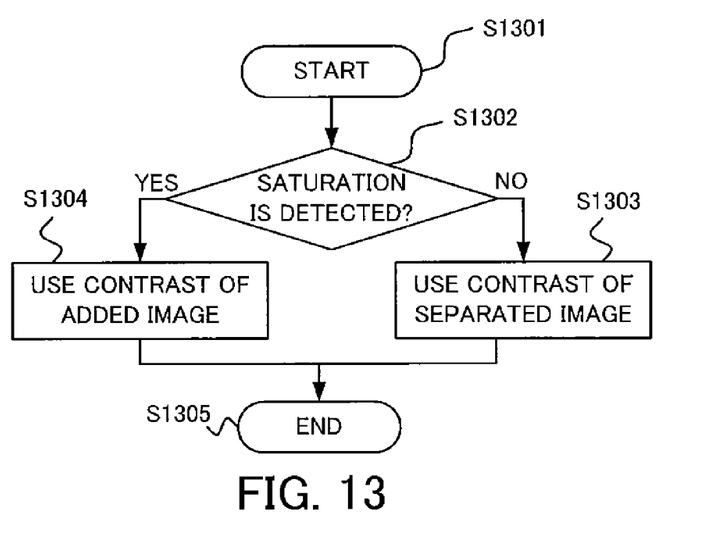
FIG. 13 is a flowchart of illustrating an operation of a control microcomputer in Embodiment 3.

Referring to FIG. 13, an operation of the control microcomputer 111 in the present embodiment will be described. FIG. 13 is a flowchart of illustrating the operation of the control microcomputer 111. First of all, in Step S1301, the operation of the control microcomputer 111 is started. Subsequently, in Step S1302, whether or not the saturation is detected by the saturation detection circuit 104 is determined. When the saturation is detected in Step S1302, the flow proceeds to Step S1304. Then, in Step S1304, the focus detection is performed using a contrast value by the signal obtained by adding the A and B images (the output signal of the A-B image adding circuit 106). On the other hand, when the saturation is not detected in Step S1302, the flow proceeds to Step S1303. Then, in Step S1303, the focus detection is performed using a contrast value by the signal obtained by separating the A and B images (the output signal of the A-B image separating circuit 108). Through one of Step S1303 or S1304, the flow is ended (Step S1305).

In the present embodiment, the image pickup apparatus 100b is configured so that any one of the contrast values of the separated image and the added image of the A and B images is simply selected to be used, but the embodiment is not limited to this. For example, the image pickup apparatus 100b may also be configured so that the contrast values of the separated image and the added image are mixed in accordance with the saturation level.

Embodiment 4

Next, an image pickup apparatus in Embodiment 4 of the present invention will be described. In the present embodiment, the saturation correction is configured to be performed using frequency distributions of the A image and the B image, and using the image pickup apparatus 100a in Embodiment 2, an image of the RAW signal stored in the storage medium 114 is corrected. For a block including a saturation region of the A image and a block including a saturation region of the B image, the saturation correction is performed using each of the correction methods (correction algorithms) described in Embodiment 1. Then, a Fourier transfer is performed for a frequency component of each of the A image and the B image so as to be determined.

Figure 14:
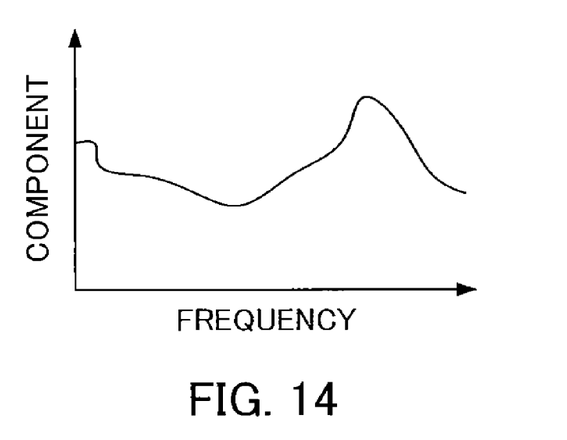
FIG. 14 is a diagram of illustrating a relation between a component and a frequency in Embodiment 4.

FIG. 14 is a diagram of illustrating a relation between a component and a frequency in the present embodiment. A lateral axis indicates the frequency and a vertical axis indicates the component. When the A image and the B image are appropriately corrected, shapes of the graphs of the frequency components in FIG. 14 are similar to each other. In the present embodiment, using the characteristics, a correction result that is appropriately corrected based on the plurality of correction algorithms is selected to be used. In the present embodiment, the image pickup apparatus is configured so that the image stored as a RAW signal is processed, but the embodiment is not limited to this, and for example it may also be configured so as to perform on-the-fly processing.

According to each of the embodiments, an image processing apparatus that performs a saturation correction to perform focus detection even when an image collapse is generated by image saturation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-054569, filed on Mar. 12, 2012, which is hereby incorporated by reference herein in its entirety.

What is claimed is:

1. An image processing apparatus that processes an image signal from an image pickup element including a plurality of pixels for one microlens, the image processing apparatus comprising:
a saturation detector configured to detect whether an output value of each of the plurality of pixels reaches a saturation level; and
a saturation corrector configured to correct, when an output value of a part of the plurality of pixels reaches the saturation level, an output value of a saturation pixel that reaches the saturation level and an output value of an adjacent pixel that shares the same microlens with the saturation pixel and does not reach the saturation level.

2. The image processing apparatus according to claim 1, wherein the saturation corrector corrects the output value of the saturation pixel and the output value of the adjacent pixel so that an added value of the output value of the saturation pixel and the output value of the adjacent pixel is maintained.

3. The image processing apparatus according to claim 1, wherein the saturation corrector corrects the output value of the saturation pixel and the output value of the adjacent pixel using an output value of a same color pixel when an output value of the same color pixel that corresponds to a microlens different from the microlens shared with the saturation pixel and the adjacent pixel does not reach the saturation level.

4. The image processing apparatus according to claim 1, wherein the saturation corrector corrects the output value of the saturation pixel and the output value of the adjacent pixel using an output value of a different color pixel and a color ratio of the same color pixel and the different color pixel when an output value of the same color pixel that corresponds to a microlens different from the microlens shared with the saturation pixel and the adjacent pixel reaches the saturation level.

5. The image processing apparatus according to claim 1, wherein the saturation corrector, in an in-focus state, corrects the output value of the saturation pixel and the output value of the adjacent pixel using a ratio of output values of a plurality of same color pixels that corresponds to a microlens different from the microlens shared with the saturation pixel and the adjacent pixel.

6. The image processing apparatus according to claim 1, wherein the saturation corrector, in an out-of-focus state, corrects the output value of the saturation pixel and the output value of the adjacent pixel so that a degree of coincidence of pupil division images is heightened based on a correlation amount obtained by shifting a phase of the pupil division images that are the output value of the saturation pixel and the output value of the adjacent pixel.

7. The image processing apparatus according to claim 1, wherein the saturation corrector changes a correction method of the output value of the saturation pixel and the output value of the adjacent pixel in accordance with a condition.

8. The image processing apparatus according to claim 1, wherein the saturation corrector corrects the output value of the saturation pixel and the output value of the adjacent pixel using a plurality of correction methods, and adopts a most reliable correction method based on a correlation calculation result of the corrected output values of the saturation pixel and the adjacent pixel.

9. The image processing apparatus according to claim 1, wherein the image pickup element has a configuration in which a semiconductor impurity concentration at a boundary of a plurality of pixels contained for the one microlens is lower than a semiconductor impurity concentration at a boundary of other pixels.

10. The image processing apparatus according to claim 1, wherein a charge generated in the saturated pixel leaks into the adjacent pixel, when the output value of one of the plurality of pixels reaches the saturation level.

11. A focus detection apparatus comprising:
the image processing apparatus according to claim 1, and
a focus detector configured to perform focus detection using an output signal from the image processing apparatus.

12. A non-transitory computer-readable storage medium storing a program that causes an information processing apparatus to execute an image processing method, the image processing method comprising the steps of:
reading an output value of each of a plurality of pixels obtained from an image pickup element including a plurality of pixels for one microlens and information of a saturation pixel indicating that the output value of each of the plurality of pixels reaches a saturation level from a storage unit; and
correcting, when an output value of a part of the plurality of pixels reaches the saturation level, an output value of the saturation pixel that reaches the saturation level and an output value of an adjacent pixel that shares the same microlens with the saturation pixel and does not reach the saturation level based on the information read from the storage unit.

* * * * *